United States Patent [19]

Hofmann

[11] 4,154,112

[45] May 15, 1979

[54] FRONT PANEL FOR A BALANCING MACHINE

[75] Inventor: Dionys Hofmann, Darmstadt-Marienhohe, Fed. Rep. of Germany

[73] Assignee: Gebr. Hofmann G.m.b.H. & Co., KG, Maschinenfabrik, Darmstadt, Fed. Rep. of Germany

[21] Appl. No.: 893,331

[22] Filed: Apr. 3, 1978

[30] Foreign Application Priority Data

May 23, 1977 [DE] Fed. Rep. of Germany ... 7716292[U]

[51] Int. Cl.² .............................................. G01M 1/16
[52] U.S. Cl. ..................................................... 73/462
[58] Field of Search ................. 73/462, 463, 460, 461, 73/464, 465, 466, 467; 340/332

[56] References Cited

U.S. PATENT DOCUMENTS

| | | | |
|---|---|---|---|
| 3,330,159 | 7/1967 | Ongaro | 73/465 |
| 3,835,712 | 9/1974 | Muller | 73/462 |
| 4,062,242 | 12/1977 | Brihier | 73/464 X |
| 4,068,532 | 1/1978 | Green et al. | 73/462 |

Primary Examiner—Jerry W. Myracle
Attorney, Agent, or Firm—Cushman, Darby & Cushman

[57] ABSTRACT

A front panel for a balancing machine in which the adjustment buttons and operational elements, including digital controls and displays are neatly and compactly grouped. This reduces the risk of improper operation.

3 Claims, 1 Drawing Figure

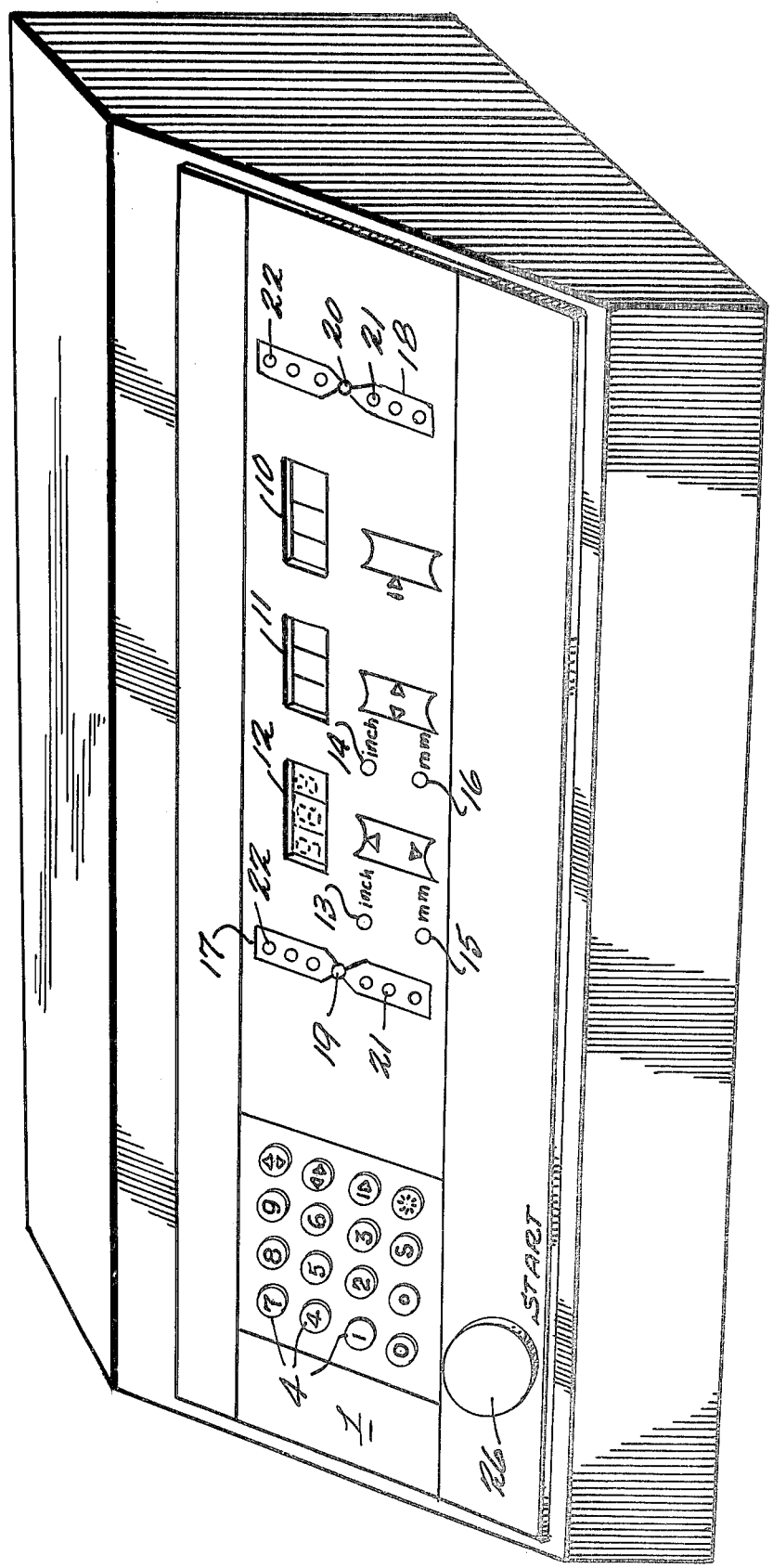

FRONT PANEL FOR A BALANCING MACHINE

The present invention relates to a front panel for a balancing machine, such as a force-measuring balancing machine, on which adjustment and operation elements, as well as indication instruments, are arranged.

Force-measuring balancing machines have rigid bearings for the accommodation of the joint of the rotor to be tested and are distinguished from other balancing machines in that optional correction planes can be selected and pre-set for the measurement of unbalance without particular calibration or measuring runs. The front panels of such prior balancing machines have rotary buttons to adjust the correction planes or distances.

Such rotary buttons or adjusting means are usually arranged in a relatively confusing manner on the front panel so that the risk of improper operation is high, even after an operator has been trained. Moreover, it is difficult to seal those points where adjustment buttons and operation elements protrude through openings on the front panel, so as to be accessible to the operator. As balancing machines are generally used in rooms where dirt, humidity and metal shavings cannot be avoided, a risk exists that the operation of the balancing machine will be impaired.

An object of this invention is to provide a balancing machine front panel on which the operation and adjustment are neatly and compactly grouped. Such a layout is aided by the employment of digital controls and displays.

This object is achieved in the present invention by utilizing a keyboard located on a plate of the front panel, the buttons of which are connected to control elements. Also, light emitting diodes are arranged in two parallel sequences, each sequence being organized in two arrow-shaped fields directed towards one another. Occupying the remainder of the plate and lying between the two diode sequences are three seven segment display groups, each group being equal in distance to adjacent groups.

Sixteen buttons or more may be provided for the keyboard. The keyboard may be of square dimensions. The keyboard may be dimensioned so as to occupy the width of the plate.

The three seven segment display groups may be arranged side by side in a linear sequence with each equidistant from adjacent groups. A further light emitting diode may be placed each between the two corresponding arrow-shaped fields of diode sequences.

These and other objects and advantages of the invention will become more apparent and more readily appreciated from the following detailed description of the presently preferred exemplary embodiment of the invention taken in conjunction with the accompanying drawing which is a perspective view of the preferred embodiment of the present invention.

Upon plate 1 of the front plate, keyboard 2 of sixteen buttons is arranged for controlling a balancing machine (not shown). The buttons are connected to control elements and have contacts which lock after pressure is applied. Eleven buttons 4 may be depressed to enter the factors 0-9 and the decimal point.

Depression of button 6 and button 7 permits respectively the rim width and the rim diameter to be entered and stored. Upon depressing button 5, the distance from the outer measuring plane to the inner correction plane is calculated and stored. The balancing machine can be equipped with a spacer key (not shown) which, when depressed, causes the rim width and rim diameter to be automatically determined. Depression, then, of button 5 causes the distance from the outer measuring plane to the inner correction plane to be determined and stored automatically. Depression of button 8 causes a display of the amount of imbalance to be converted to a display of the values representing the geometry of the rim on display groups 10-12, which are arranged as sets of seven segment displays.

During a measuring run, the distance of the outer measuring plane to the inner correction plane is displayed on display group 10, the rim width is displayed on display group 11 and the rim diameter is displayed on display group 12. After the measuring run is completed, the amount of imbalance is displayed on groups 10-12. As mentioned above, depression of button 8 converts the display to the values representing the geometry of the rim, which are stored in inches when supervisory lamps 13 and 14 are lit. By twice depressing buttons 6 and 7, storage is in metric units, as indicated by the energization of supervisory lamps 15 and 16.

Button 9 causes groups 10-12 to switch between displaying the amounts of dynamic and static imbalance. When displaying dynamic imbalance, group 10 indicates the inner correction plane and group 12 indicates the outer correction plane of the rotor. Instrument 11 displays the static amount of imbalance.

Light emitting diode sequence 17 related to the inner correction plane and light emitting diode sequence 18, related to the outer correction plane serve for marking of the direction of indexing. Each of sequences 17 and 18 are comprised of two groups of three light emitting diodes organized in arrow-shaped fields 21 and 22, with each field 21 directed toward the corresponding field 22. When static imbalance is displayed, sequences 17 and 18 are synchronously working. Seven luminous diodes are preferably employed in each of sequences 17 and 18. After the correct angular location of indexing is reached, e.g., when the "light" point of the wheel shows upward, the middle diodes 19 and 20 respectively are energized.

Symbols can be provided in accordance with the function of the instruments, close to supervisory lamps 13-16 on indication instruments 10-12 and on buttons 4-9. Moreover, a start button 26 can be provided.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention as defined in the following claims.

What is claimed is:

1. A front panel for a balancing machine comprising: a plate;
   a keyboard mounted to said plate, said keyboard having at least sixteen buttons adapted for connection to control elements of said balancing machine and being a square of dimensions substantially the same as the width of said plate;
   a plurality of light emitting diodes mounted to said plate in two parallel sequences, each sequence comprising light emitting diodes in two arrow-shaped fields, each of said two fields directed towards the other and an additional light emitting diode positioned between each of said fields; and three display groups mounted to said plate and arranged in a linear sequence, each of said groups comprising at least one seven segment display and being spaced equidistant from the adjacent said groups.

2. Apparatus as in claim 1 wherein each of said sequences comprises seven light emitting diodes.

3. Apparatus as in claim 1 wherein each of said three display groups comprises three of said seven segment displays.

* * * * *